Patented May 15, 1951

2,552,814

UNITED STATES PATENT OFFICE 2,552,814

CYANOESTERS

Anderson W. Ralston and Lowell T. Crews, Chicago, Ill., assignors to Armour and Company, Chicago, Ill., a corporation of Illinois No Drawing. Application June 2, 1944,
Serial No. 538,532

5 Claims. (Cl. 260—404)

This invention relates to esters of ethylene cyanohydrine and more particularly to the fatty acid esters of ethylene cyanohydrine, and to processes for their preparation. These esters are useful as softeners or plasticizers for elastomers, resins, plastics and similar materials and may be used for other purposes.

In the manufacture of a synthetic plastic or elastic material it is important to incorporate along with the usual polymers or copolymers substances which will overcome any objectionable tendency toward brittleness and impart the desired degree of flexibility. Many factors enter into the usefulness of a substance for this purpose. For example, the substance should be compatible with the materials commonly used in the preparation of such resins, should not discolor during processing and preferably should have the ability to impart acid and alkali resistance.

We have discovered a series of compounds which are effective as softeners or plasticizers. These compounds have not, to our knowledge, been known before. They may be called the fatty acid esters of ethylene cyanohydrine. Their general formula may be written as follows:

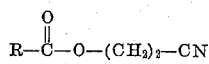

where R is a hydrocarbon radical of at least 8 carbon atoms.

These compounds may be prepared by mixing ethylene cyanohydrine with an esterifying agent such as fatty acids, their chlorides or anhydrides to react the same and produce the fatty acid esters. Where the acid chloride is used the reaction is preferably carried out in the presence of a basic catalyst such as pyridine, sodium hydroxide, tertiary butylamine or aniline. The basic catalyst serves to take up the acid formed as a result of the esterification and prevent hydrolysis of the nitrile group of the ester product.

The esterification reaction may be preferably carried out in a suitable solvent such as carbon tetrachloride or ether.

Following is a specific example of the preparation of β-cyanoethyl oleate:

Example

A quantity of oleoyl chloride is mixed with an equal volume of carbon tetrachloride and cooled to 0° C. in a container equipped with a mechanical stirrer and a drying tube. The solution is kept at this temperature and stirred vigorously throughout the course of the reaction. An amount of pyridine in equimolar proportion to the oleoyl chloride is added to the solution and a creamy emulsion forms. Sufficient solvent is added to make the mass fluid. Then an equimolar amount of ethylene cyanohydrine is slowly added and the mixture allowed to warm gradually to room temperature after which stirring is continued for two or more hours. Additional solvent is added to the extent of about 100% by volume. The crystalline pyridine hydrochloride which slowly forms is filtered from the carbon tetrachloride solution. The solution is then washed with 1% aqueous potassium carbonate until all free acid has been removed as soap. Next the solution is washed successively with 1% hydrochloric acid, water, 1% aqueous potassium carbonate and finally with water until the washings are non-basic. The washed solution is dried over anhydrous sodium sulfate and filtered. The solvent is removed over a steam bath at a temperature of 150 mm. of mercury. The residue is heated for one hour more on the steam bath while subjected to a pressure of 5 to 10 mm. of mercury to remove traces of solvent. 95% of the calculated yield of β-cyanoethyl oleate is obtained.

If desired, ether may be used in place of carbon tetrachloride and a dialkyl aniline in place of pyridine in the above procedure.

Various other specific procedures may be used. For example, mixtures of oleic acid and ethylene cyanohydrine are heated to 150° C. to 200° C. and the removal of water vapor facilitated by bubbling a slow stream of inert gas through the mixture. A small amount of alkali may be added if desired.

Also, we may reflux a mixture of oleic acid, ethylene cyanohydrine, benzene and a mild acid catalyst in a condenser with a drying attachment.

Any fatty acid, its chloride or anhydride, may be used in preparing the new compounds. Though acids of 8 or more carbon atoms may be used we prefer to use the fatty acid esterifying agents having at least 12 carbon atoms in the hydrocarbon radical such as lauric acid, palmitic acid, oleic acid, linoleic acid and stearic acid or their corresponding chlorides or anhydrides. The acids may be saturated or unsaturated. In some instances the cyanoesters prepared using unsaturated esterification agents are preferred because of their more favorable fluid characteristics. Suitable agents for esterification may be obtained through hydrolysis of the natural fats and oils such as the animal oils like tallow or lard, vegetable oils like soybean oil, cottonseed oil, peanut oil or linseed oil, and fish oils like whale oil, menhaden oil, etc.

We believe that some of the desirable characteristics of our cyanoesters are due to the presence in their molecular structure of both the fatty acid ester group and the nitrile group.

Our new compounds may be incorporated into resins of the vinyl type such as the various polyvinyl resins and the resulting resinous compositions have the desirable qualities of flexibility and ductility. Other substances in which the cyanoesters may be employed are synthetic elastomers such as polymerized butadiene or copolymers thereof, for example, copolymers formed from butadiene and acrylonitrile.

While in the foregoing description we have given certain modes of practice it is understood that many modifications and changes may be made all within the spirit of the invention.

Having thus described our invention, what we claim is:

1. An ester of ethylene cyanohydrine and a fatty acid having at least 12 carbon atoms.

2. A compound of the formula:

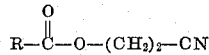

where R is an aliphatic hydrocarbon group of at least 8 carbon atoms.

3. An ester of ethylene cyanohydrine and a fatty acid having at least 18 carbon atoms and containing at least one unsaturated linkage between said carbon atoms.

4. An oleic acid ester of ethylene cyanohydrine.

5. An ester of ethylene cyanohydrine and a fatty acid having at least 8 carbon atoms.

ANDERSON W. RALSTON.
LOWELL T. CREWS.

REFERENCES CITED

The following references are of record in the file of this patent:

UNITED STATES PATENTS

| Number | Name | Date |
|---|---|---|
| 2,282,646 | De Groote | May 12, 1942 |
| 2,340,482 | Lycan | Feb. 1, 1944 |
| 2,379,297 | Harmon et al. | June 26, 1945 |
| 2,383,137 | Lecher et al. | Aug. 21, 1945 |
| 2,396,292 | Slotterbeck | Mar. 12, 1946 |

OTHER REFERENCES

Lowy and Harrow: "An Introduction to Organic Chemistry" (1940), 5th edition, Wiley & Sons, page 92.